(12) United States Patent
Sarikhani

(10) Patent No.: US 11,088,642 B2
(45) Date of Patent: Aug. 10, 2021

(54) ELECTRIC WINDING EXCHANGER SYSTEM

(71) Applicant: Ali Sarikhani, Irvine, CA (US)

(72) Inventor: Ali Sarikhani, Irvine, CA (US)

(73) Assignee: SCNEWTON INC., Novi, MI (US)

( * ) Notice: Subject to any disclaimer, the term of this patent is extended or adjusted under 35 U.S.C. 154(b) by 0 days.

(21) Appl. No.: 16/995,803

(22) Filed: Aug. 17, 2020

(65) Prior Publication Data

US 2021/0152108 A1    May 20, 2021

Related U.S. Application Data

(63) Continuation-in-part of application No. 29/713,568, filed on Nov. 17, 2019, now abandoned.

(51) Int. Cl.
| | |
|---|---|
| *H02P 1/00* | (2006.01) |
| *H02P 3/00* | (2006.01) |
| *H02P 5/00* | (2016.01) |
| *H02P 6/182* | (2016.01) |
| *H02P 9/02* | (2006.01) |

(52) U.S. Cl.
CPC .............. *H02P 6/182* (2013.01); *H02P 9/02* (2013.01); *H02P 2201/09* (2013.01)

(58) Field of Classification Search
CPC .................................. H02P 6/182; H02P 9/02
USPC ........................................................ 318/139
See application file for complete search history.

(56) References Cited

U.S. PATENT DOCUMENTS

| | | |
|---|---|---|
| 2004/0131342 A1 | 7/2004 | Masino |
| 2005/0206263 A1 | 9/2005 | Cai et al. |
| 2007/0018598 A1 | 1/2007 | Nichols |
| 2009/0128071 A1 | 5/2009 | Brown |
| 2020/0358333 A1* | 11/2020 | Wakabayashi ........... B60K 6/26 |

FOREIGN PATENT DOCUMENTS

EP          0123807 B1    10/1988

\* cited by examiner

*Primary Examiner* — Erick D Glass

(57) ABSTRACT

An electric winding exchanger system increases torque or speed performance of multi-phase electric motors and electric drive modules. The system includes an electronic control unit, a back electromotive force (EMF) boosting circuit, a plurality of high-voltage terminals, an electric motor, and a motor control unit. The electronic control unit receives and processes commands from the motor control unit. The back EMF boosting circuit adjusts the winding arrangements of the electric motor in order to change the state of the electric motor. The plurality of high-voltage terminals transfers high voltage electrical energy from the back EMF boosting circuit to the electric motor and vice versa. The motor control unit allows a user to input commands in order to activate increased torque or speed performance for the electric motor. The electric motor is preferably a multi-phase electric motor of an electric or hybrid vehicle.

15 Claims, 12 Drawing Sheets

ELECTRIC WINDING EXCHANGER SYSTEM

The current application is a continuation-in-part (CIP) application of the U.S. non-provisional design application serial number 29/713,568 filed on Nov. 17, 2019.

FIELD OF THE INVENTION

The present invention relates generally to devices for motor vehicles. More specifically, the present invention is an electric winding exchanger system for multi-phase electric motors and electric drive modules.

BACKGROUND OF THE INVENTION

Multi-phase electric motor-controllers-battery systems are widely used in gasoline vehicles, electric vehicles, and hybrid electric vehicles. These multi-phase motor-controller-battery systems, such as 3-phase or 5-phase or 6-phase or 9-phase systems, have fully controllable torque and speed on the shaft of motors for a wide operation range but with limited boundary. The first basic boundary of multi-phase motor-controller-battery is the boundary of maximum electrical motor torque for specified duration (for example: lower than 10 seconds) from low to medium speed which is mainly due to the limits of controller and battery current rated values for specified duration and to the limit of motor maximum torque for specified volume. The second basic boundary of multi-phase motor-controller-battery is maximum electrical motor speed for any duration which is mainly due to the limit of battery voltage value.

Thus, it is very desirable to exceed beyond above mentioned torque and speed boundaries without changing the motor volume, the current of controller and the voltage of the battery. This present invention provides an electric winding exchanger system to overcome the limits and go beyond the boundaries. The electric winding exchanger is designed as a new hardware-software device for use in electric drive modules of electric vehicles, plug in hybrid electric vehicles, and hybrid electric vehicles. The electric winding exchanger system is physically located between a multi-phase electric motor and a motor control unit. The electric winding exchanger system is a controllable device from vehicle or controller. Controlling and exchanging to the optimal configuration of electric winding of motor is the method for overcoming the limits and going above torque and speed boundaries. Other desirable features and characteristics of the present disclosure will become apparent from the subsequent detailed description and the appended claims, taken in conjunction with the accompanying drawings and this background discussion.

SUMMARY OF THE INVENTION

In one embodiment, the location of the electric winding exchanger system is disclosed for an electric motor-controller-battery system. The electric motor-controller-battery system defines the base system. The electric motor-controller-battery system includes a n-phase electric motor, a n-phase motor control unit, and a high-voltage battery system integrated and characterized inside the vehicle. The electric motor-controller-battery system also includes a n-phase cable between motor and controller. The system includes a DC cable between controller and battery. The system also includes electric motor terminal block. The electric winding exchanger system is physically located between a multi-phase motor and a multi-phase motor control unit. The system may structurally be integrated with the multi-phase electric motor housing. High-voltage circuits of the electric winding exchanger system is connected to the electric motor from one side and form the other side to the motor control unit.

In another embodiment, operation states of the electric winding exchanger system are disclosed. The operation states include five operation states. Operation state 1 is a normal torque mode. Operation state 2 is a high-torque mode. Operation state 3 is a high-speed mode. Operation mode 4 is a disconnected state. And operation mode 5 is a transient state allowing transition from any state to another state.

In another embodiment, a principal of operation of the electric winding exchanger system is disclosed. The principal of operation includes the description of four major operation modes of electric winding exchanger. The system includes the principal of operation for overcoming the boundaries of torque and speed without increasing the limits of the motor control unit, the battery current, electric motor peak torque, and/or the battery voltage.

The system includes a set of high-power n-phase terminals to be connected to the controller side. The set of high-power terminals to be connected to the motor winding sets. The hardware also includes a housing, a back EMF boosting circuit, an electronic control unit, several high-power controlled relays, and a low voltage control terminal.

In another embodiment, an electronic control unit is disclosed. The electronic control unit includes a SERIAL communication, two low voltage relays, a DC voltage regulator, a microcontroller for main command evaluations. Additionally, the control board comprises three terminals. The first terminal includes an input Ground, 12 direct current voltage (VDC), clock ports, serial communication ports [RX, TX], and analogue command inputs. The second terminal is for data programming of the micro controller. The third terminal includes hall sensor ports, 5 VDC supply for hall sensors, and two output commands.

In an additional embodiment, electric winding exchanger software embedded inside the microcontroller of the electronic control unit of the electric winding exchanger system is disclosed. The software includes commands block, fault diagnosis block, excitation signal block, send and receive block, and switching block. Each block includes several sub-functions enabling the output of that block. The send-receive block includes a function which evaluates and receives commands from the motor control unit or vehicle. The send-receive block includes another function which send the feedbacks received from either fault diagnosis block, excitation block, and command block.

In additional embodiment, the system includes the winding arrangement of electric motor for connection to the electric winding exchanger at the motor terminal ports. The winding arrangement includes the winding segments or coils, the number of permanently connected neutrals, and a table comprising different winding arrangements for the motor which are suitable for connection to the electric winding exchanger.

In an additional embodiment, utilization of electric winding for torque boosting, speed boosting, and disconnection of electric power circuit between the motor control unit and the electric motor is disclosed. This utilization includes the basic operation of electric winding exchanger in vehicle.

DETAIL DESCRIPTIONS OF THE INVENTION

Figure 1:
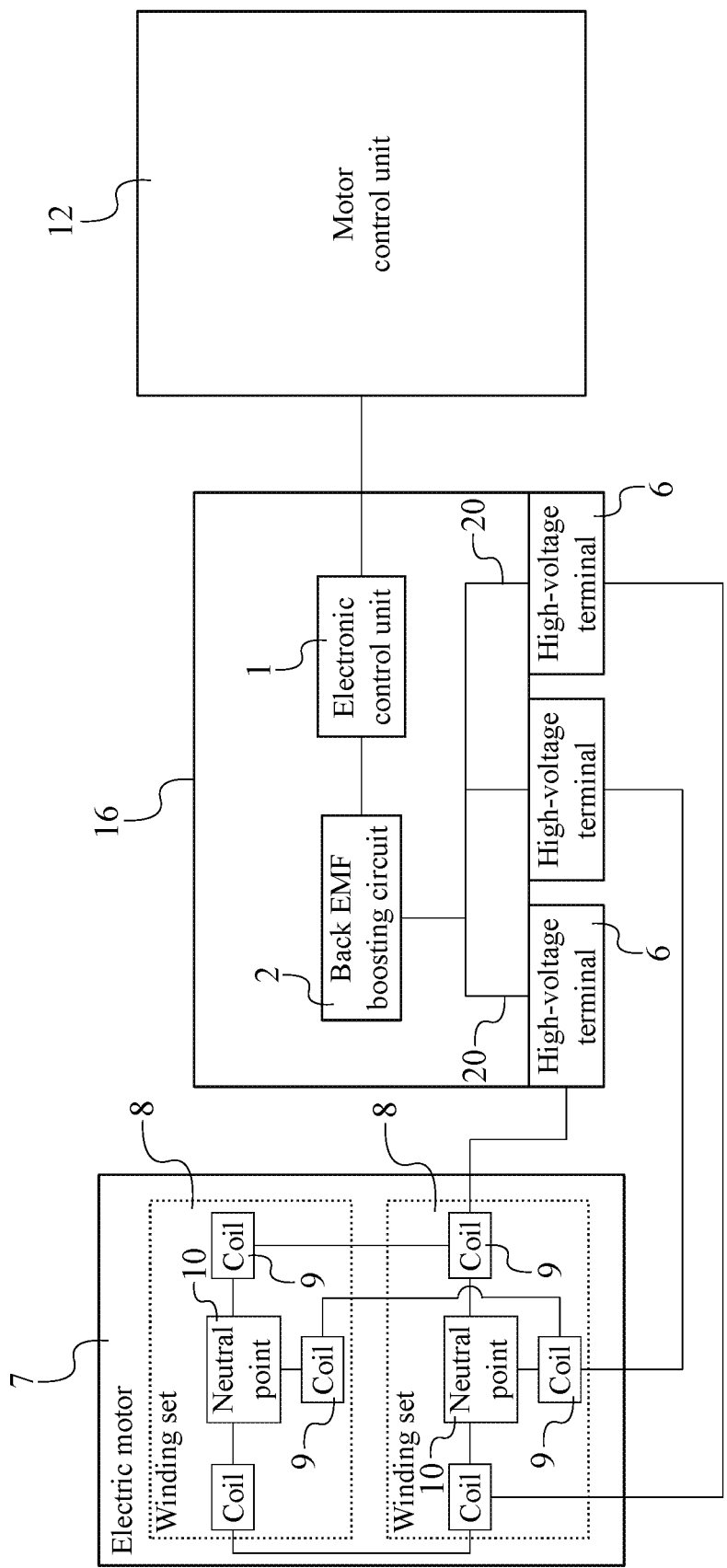
FIG. 1 is a schematic diagram illustrating the overall system of the present invention.

All illustrations of the drawings are for the purpose of describing selected versions of the present invention and are not intended to limit the scope of the present invention.

In reference to FIGS. 1 through 12, the present invention is an electric winding exchanger system that increases torque or speed performance of multi-phase electric motors and electric drive modules. A preferred embodiment of the present invention comprises an electronic control unit 1, a back electromotive force (EMF) boosting circuit 2, a plurality of high-voltage terminals 6, an electric motor 7, and a motor control unit 12. The electronic control unit 1 receives and processes commands from the motor control unit 12. The back EMF boosting circuit 2 adjusts the winding arrangements of the electric motor 7 in order to change the state of the electric motor 7. The plurality of high-voltage terminals 6 transfers high voltage electrical energy from the back EMF boosting circuit 2 to the electric motor 7 and vice versa. The motor control unit 12 allows a user to input commands in order to activate increased torque or speed performance for the electric motor 7. The electric motor 7 is preferably a multi-phase electric motor of an electric or hybrid vehicle.

The general configuration of the aforementioned components allows the present invention to increase torque or speed performance of multi-phase electric motors and electric drive modules. With reference to FIG. 1, the electric motor 7 comprises a plurality of winding sets 8, and each of the plurality of winding sets 8 comprises a plurality of coils 9 and a neutral point 10. The motor control unit 12 is electronically connected to the electronic control unit 1. This allows commands to be relayed from the motor control unit 12 and to the electronic control unit 1. The electronic control unit 1 is electronically connected to the back EMF boosting circuit 2. This allows the electronic control unit 1 to manage the back EMF boosting circuit 2. The electric motor 7 is configured to operate through a plurality of electrical phases. Each of the plurality of electrical phases is associated to a corresponding high-voltage terminal from the plurality of high-voltage terminals 6 and a corresponding coil from the plurality of coils 9. The neutral point 10 is selectively and electrically connected to each of the plurality of coils 9. In further detail, each of the plurality of coils 9 can be electrically grounded by the neutral point 10 if the connection between the neutral point 10 and each of the plurality of coils 9 is closed. The corresponding coil is selectively and electrically connected to the back EMF boosting circuit 2 by the corresponding high-voltage terminal. In further detail, the corresponding coil can be electrically powered by the back EMF boosting circuit 2 via the corresponding high-voltage terminal. Further, the corresponding coil for an arbitrary winding set is selectively and electrically connected to the corresponding coil for another winding set. The arbitrary winding set and the other winding set are from the plurality of winding sets 8. In further detail, electrical energy can be transferred from one coil to another coil. Thus, the electrical phases can be adjusted by adjusting the electrical connections between the corresponding coil for an arbitrary winding set and the corresponding coil for another winding set, the electrical connections between the corresponding coil and the corresponding high-voltage terminal, and the electrical connections between the neutral point 10 and each of the plurality of coils 9. Dependent of the adjustments to the electrical phases, improved torque or speed performance can be outputted by the electrical motor.

Figure 2:
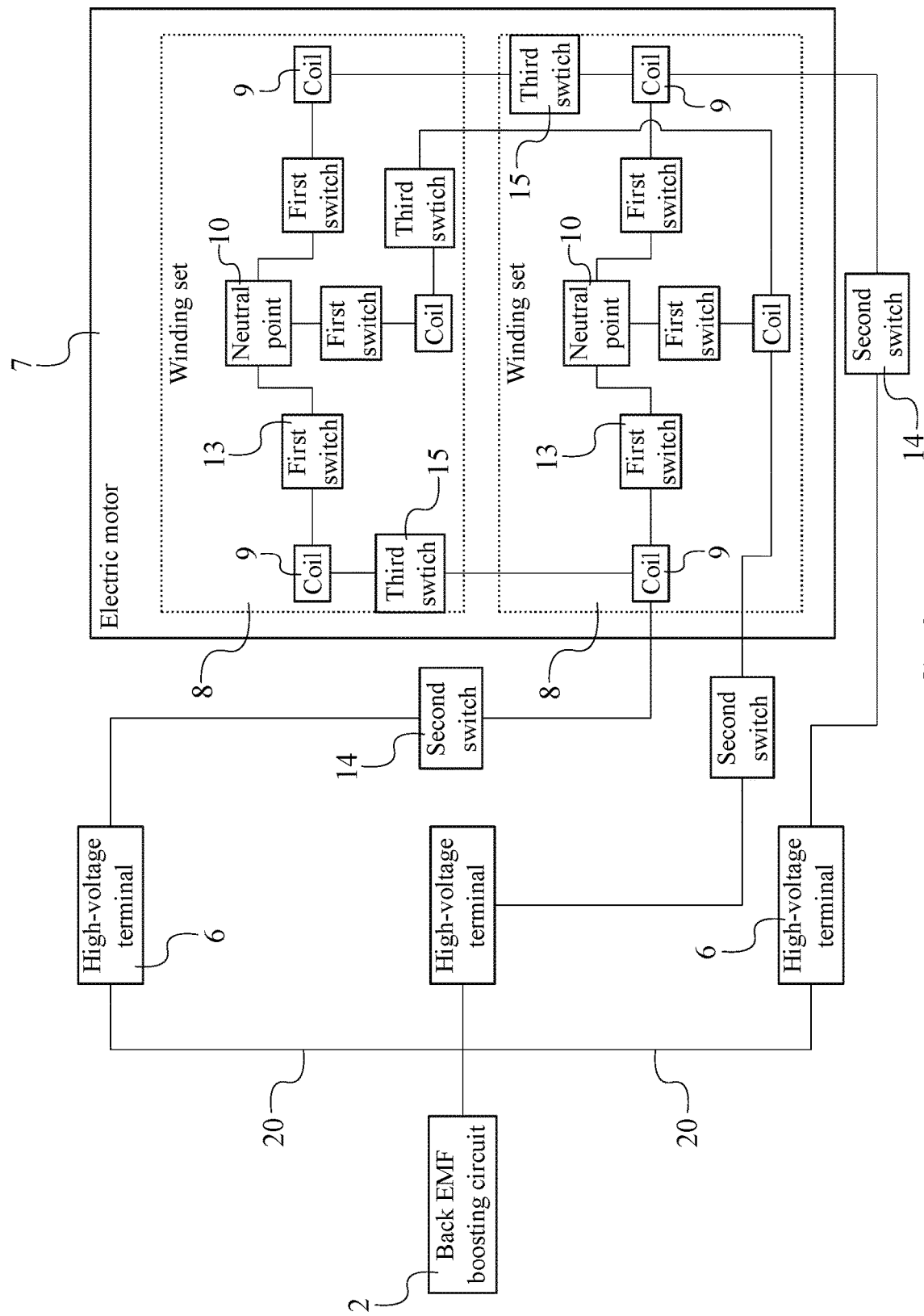
FIG. 2 is a schematic diagram illustrating the system of the present invention with the plurality of first switches, the plurality of second switches, and the plurality of third switches.

With reference to FIG. 2, the present invention may further comprise a plurality of first switches 13 in order to open or close electrical connections between the neutral point 10 and each of the plurality of coils 9. The neutral point 10 is electrically connected to the corresponding coil by a corresponding first switch from the plurality of first switches 13. Thus, the plurality of first switches 13 can be used to open or close the electrical connection between the neutral point 10 and each of the plurality of coils 9. The back EMF boosting circuit 2 is electronically connected to each of the plurality of first switches 13. Thus, the back EMF boosting circuit 2 can manage each of the plurality of first switches 13 dependent on commands relayed from the electronic control unit 1.

Figure 4:
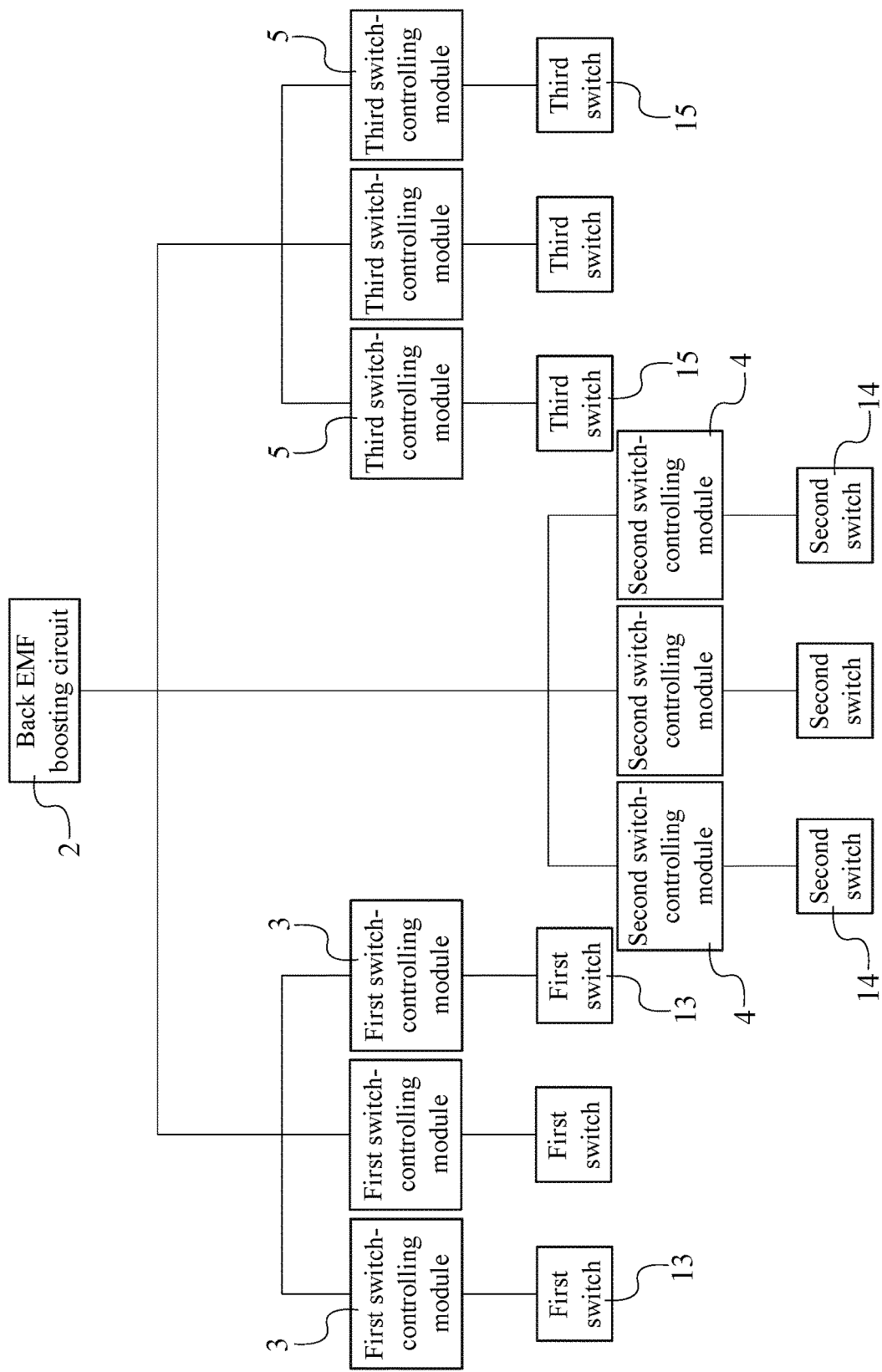
FIG. 4 is a schematic diagram illustrating the electrical and electronic connections between the back EMF boosting circuit and the plurality of first switches, the plurality of second switches, and the plurality of third switches.
Figure 10:
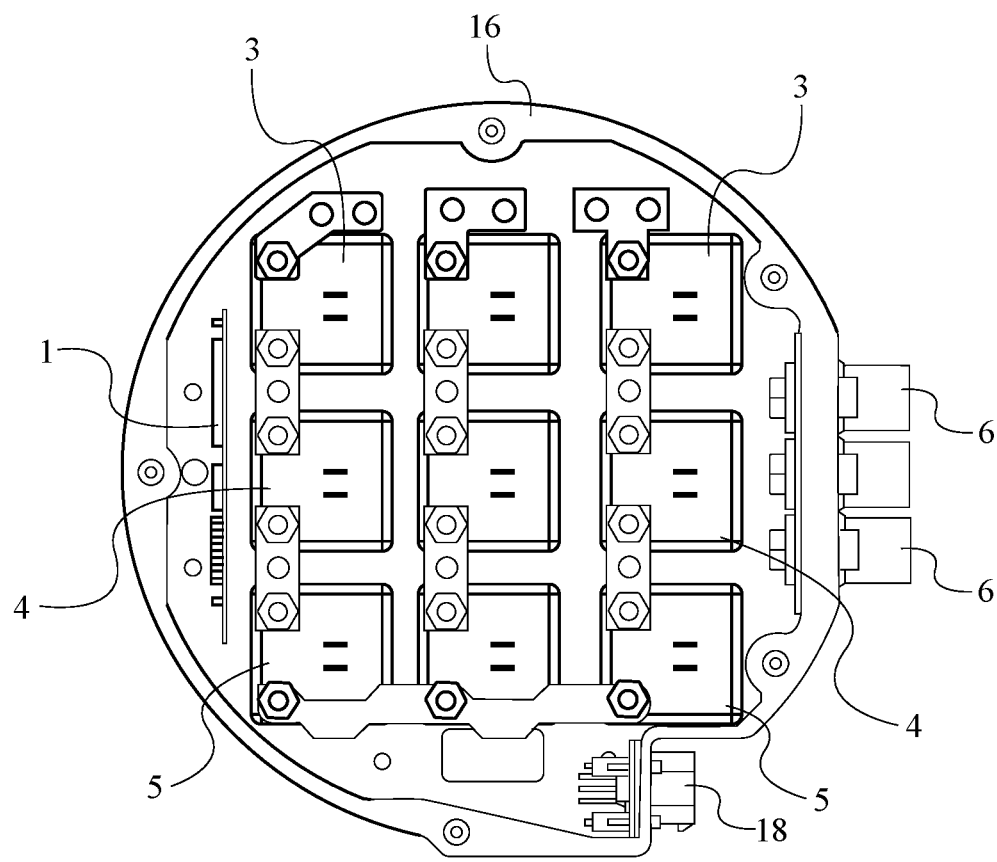
FIG. 10 is an open side view of the housing displaying the plurality of first switch-controlling modules, the plurality of second switch-controlling modules, and the plurality of third switch-controlling modules.

In order for the present invention to efficiently manage each of the plurality of first switches 13 and with reference to FIGS. 4 and 10, the back EMF boosting circuit 2 may comprise a plurality of first switch-controlling modules 3. The electronic control unit 1 is electronically connected to each of the plurality of first switch-controlling modules 3. This allows commands to be relayed from the electronic control unit 1 to each of the plurality of first switch-controlling modules 3. Further, each of the plurality of first switch-controlling modules 3 is electronically connected to a corresponding first switch from the plurality of first switches 13. In further detail, the present invention provides a single first switch-controlling module for each of the plurality of first switches 13 in order for the plurality of first switches 13 to be precisely controlled.

Similarly and with reference to FIG. 2, the present invention may further comprise a plurality of second switches 14 in order to open or close electrical connections between the corresponding coil and the corresponding high-voltage terminal. The corresponding coil is electrically connected to the corresponding high-voltage terminal by a corresponding second switch from the plurality of second switches 14. Thus, the plurality of second switches 14 can be used to open or close the electrical connection between the corresponding coil and the corresponding high-voltage terminal. The back EMF boosting circuit 2 is electronically connected to the each of the plurality of second switches 14. Thus, the back EMF boosting circuit 2 can manage each of the plurality of second switches 14 dependent on commands relayed from the electronic control unit 1.

In order for the present invention to efficiently manage each of the plurality of second switches 14 and with reference to FIGS. 4 and 10, the back EMF boosting circuit 2 may further comprise a plurality of second switch-controlling modules 4. The electronic control unit 1 is electronically connected to each of the plurality of second switch-controlling modules 4. This allows commands to be relayed from the electronic control unit 1 to each of the plurality of second switch-controlling modules 4. Further, each of the plurality of second switch-controlling modules 4 is electronically connected to a corresponding second switch from the plurality of second switches 14. In further detail, the present invention provides a single second switch-controlling module for each of the plurality of second switches 14 in order for the plurality of second switches 14 to be precisely controlled.

Similar to the plurality of first switches 13 and the plurality of second switches 14 and with reference to FIG. 2, the present invention may further comprise a plurality of third switches 15 in order to open or close electrical connections between the corresponding coil for the arbitrary winding set and the corresponding coil for the other winding set. The corresponding coil for the arbitrary winding set is electrically connected to the corresponding coil for the other winding set by a corresponding third switch from the plurality of third switches 15. Thus, the plurality of third switches 15 can be used to open or close the electrical connection between the corresponding coil of the arbitrary winding set and the corresponding coil for the other winding set. The back EMF boosting circuit 2 is electronically connected to the each of the plurality of third switches 15. Thus, the back EMF boosting circuit 2 can manage each of the plurality of third switches 15 dependent on commands relayed from the electronic control unit 1.

In order for the present invention to efficiently manage each of the plurality of third switches 15 and with reference to FIGS. 4 and 10, the back EMF boosting circuit 2 may further comprise a plurality of third switch-controlling modules 5. The electronic control unit 1 is electronically connected to each of the plurality of third switch-controlling modules 5. This allows commands to be relayed from the electronic control unit 1 to each of the plurality of third switch-controlling modules 5. Further, each of the plurality of third switch-controlling modules 5 is electronically connected to a corresponding third switch from the plurality of third switches 15. In further detail, the present invention provides a single third switch-controlling module for each of the plurality of third switches 15 in order for the plurality of third switches 15 to be precisely controlled.

Figure 5:
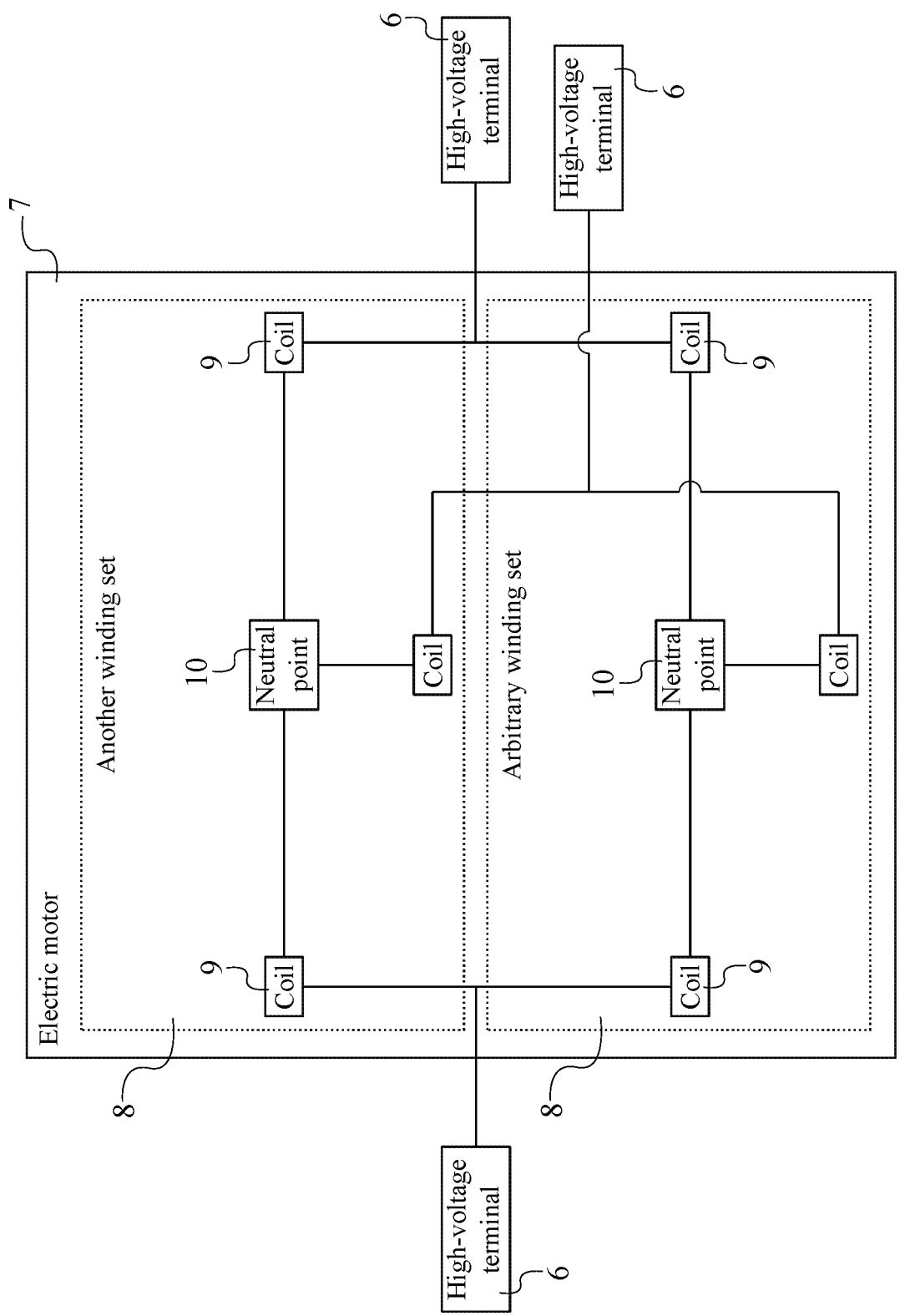
FIG. 5 is a schematic diagram illustrating the electric motor in the normal state.

With reference to FIG. 5, the present invention can be used to operate the electric motor 7 in a normal state. The normal state is the default state of the electric motor 7 where the electric motor 7 operates at the standard performance attributes of the electric motor 7. In the normal state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically connected to each of the plurality of coils 9 for the other winding set. Thus, the corresponding first switch between the neutral point 10 of the other winding set and the corresponding coil of the arbitrary winding set is in a closed position in order to electrically ground each of the plurality of coils 9 for the other winding set. Moreover, the corresponding coil for the arbitrary winding set and the corresponding coil for the other winding set is electrically connected in parallel with the corresponding high-voltage terminal. As a result of this electrical connection, the corresponding second switch between the corresponding coil of the arbitrary winding set and the corresponding high-voltage terminal is in a closed position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 6:
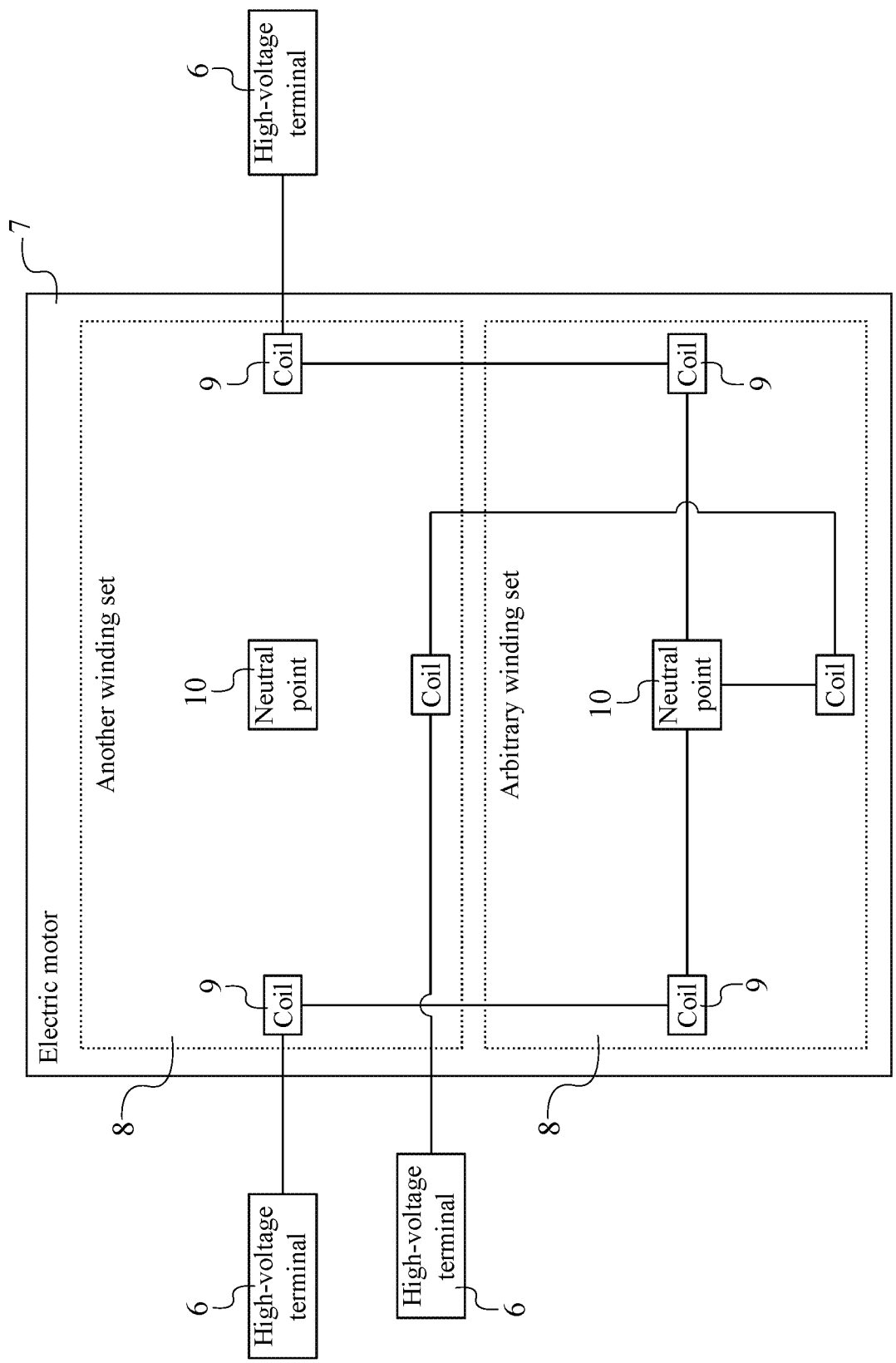
FIG. 6 is a schematic diagram illustrating the electric motor in the high-torque state.

With reference to FIG. 6, the present invention can be used to operate the electric motor 7 in a high-torque state. The high-torque state is the improved state of the electric motor 7 where the electric motor 7 operates at the higher torque performance attributes of the electric motor 7. In the high-torque state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, the corresponding first switch between the neutral point 10 of the other winding set and the corresponding coil of the arbitrary winding set is in an open position in order to not electrically ground each of the plurality of coils 9 for the other winding set. Moreover, the corresponding coil for the arbitrary winding set and the corresponding coil for the other winding set is electrically connected in series with the corresponding high-voltage terminal. As a result of this electrical connection, the corresponding second switch between the corresponding coil of the arbitrary winding set and the corresponding high-voltage terminal is in an open position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in a closed position.

Figure 7:
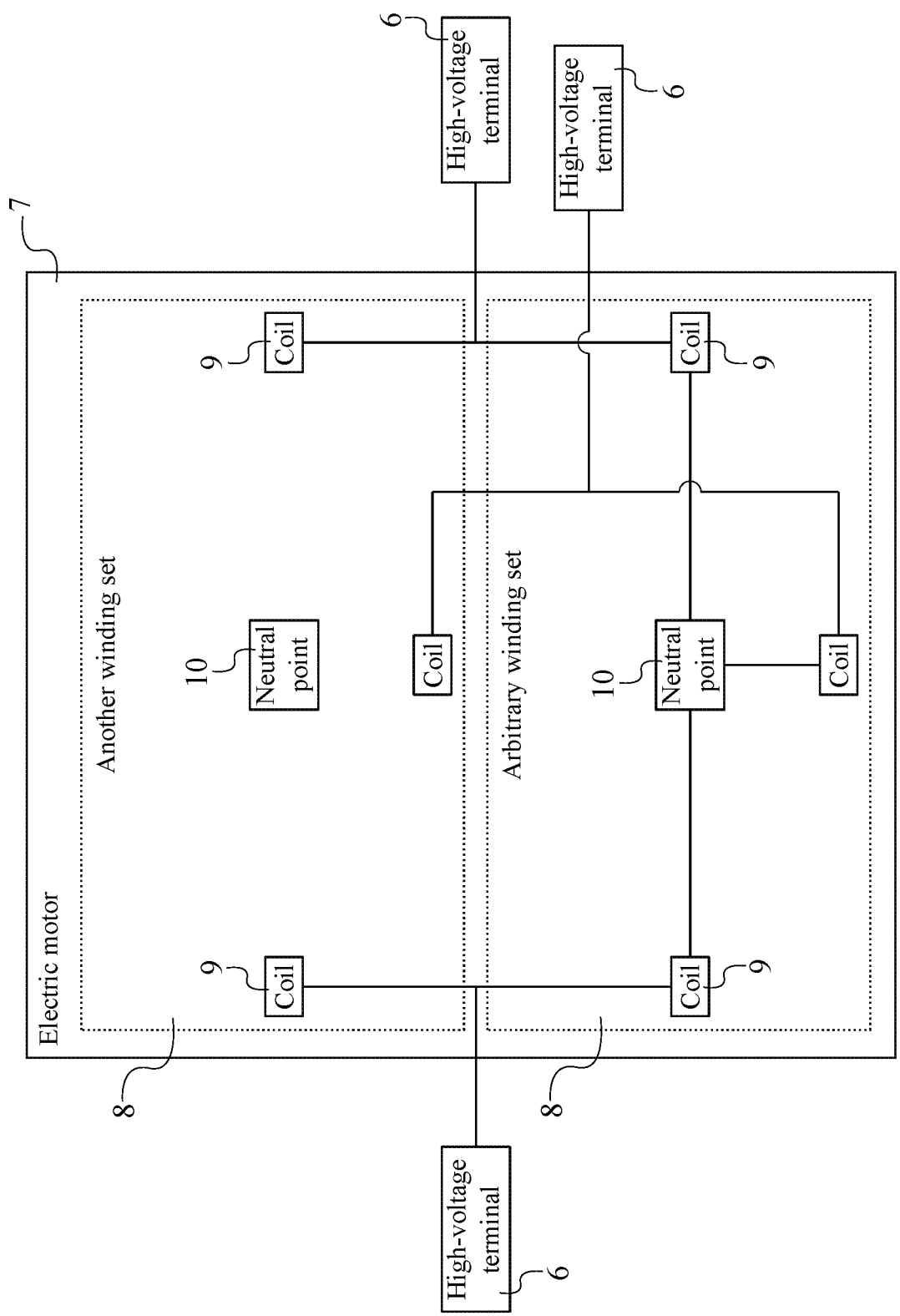
FIG. 7 is a schematic diagram illustrating the electric motor in the transient state.

With reference to FIG. 7, the present invention can be used to switch the electric motor 7 to a transient state. The transient state is the intermediate state of the electric motor 7 where the electric motor 7 switches between one state to another. In the transient state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, the corresponding first switch between the neutral point 10 of the other winding set and the corresponding coil of the arbitrary winding set is in an open position in order to not electrically ground each of the plurality of coils 9 for the other winding set. Moreover, the corresponding coil for the arbitrary winding set and the corresponding coil for the other winding set is electrically connected in series with the corresponding high-voltage terminal. As a result of this electrical connection, the corresponding second switch between the corresponding coil of the arbitrary winding set and the corresponding high-voltage terminal is in a closed position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 8:
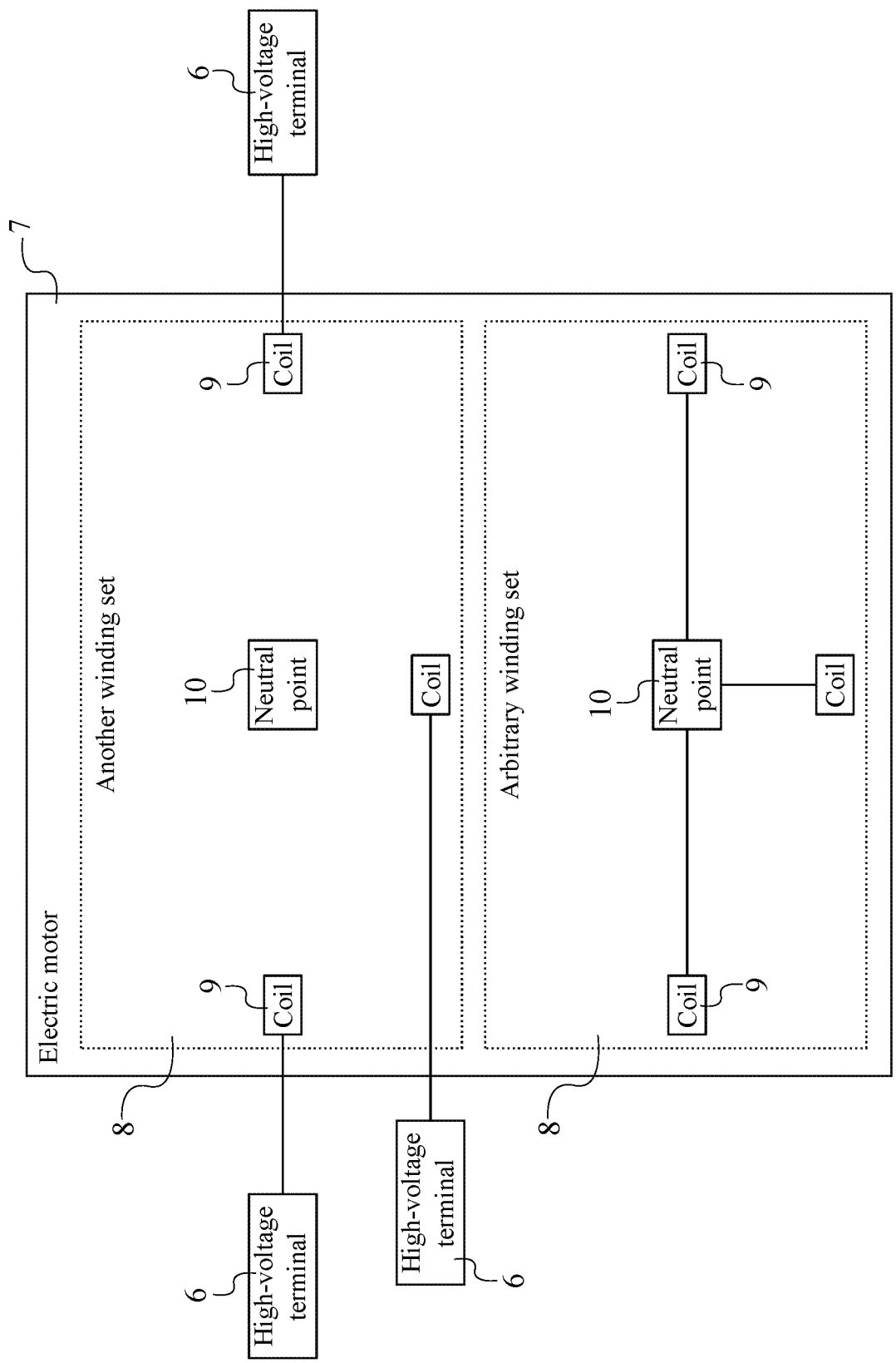
FIG. 8 is a schematic diagram illustrating the electric motor in the disconnected state.

With reference to FIG. 8, the present invention can be used to switch the electric motor 7 to a disconnected state. The disconnected state is a state of the electric motor 7 where the electric motor 7 is disconnected from the plurality of high-voltage terminals 6. In the disconnected state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, each of the plurality of coils 9 for the other winding set is not electrically grounded. For each of the plurality of coils 9 for the other winding set to not be electrically grounded, each of the plurality of first switches 13 between the neutral point 10 for the other winding set and each of the plurality of coils 9 for the other winding set is in an open position. Moreover, the corresponding coil for the arbitrary winding set is electrically disconnected with the corresponding high-voltage terminal, and the corresponding coil for the other winding set is electrically connected with the corresponding high-voltage terminal. As a result of this electrical connection, the corresponding second switch between the corresponding coil of the arbitrary winding set and the corresponding high-voltage terminal is in an open position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 3:
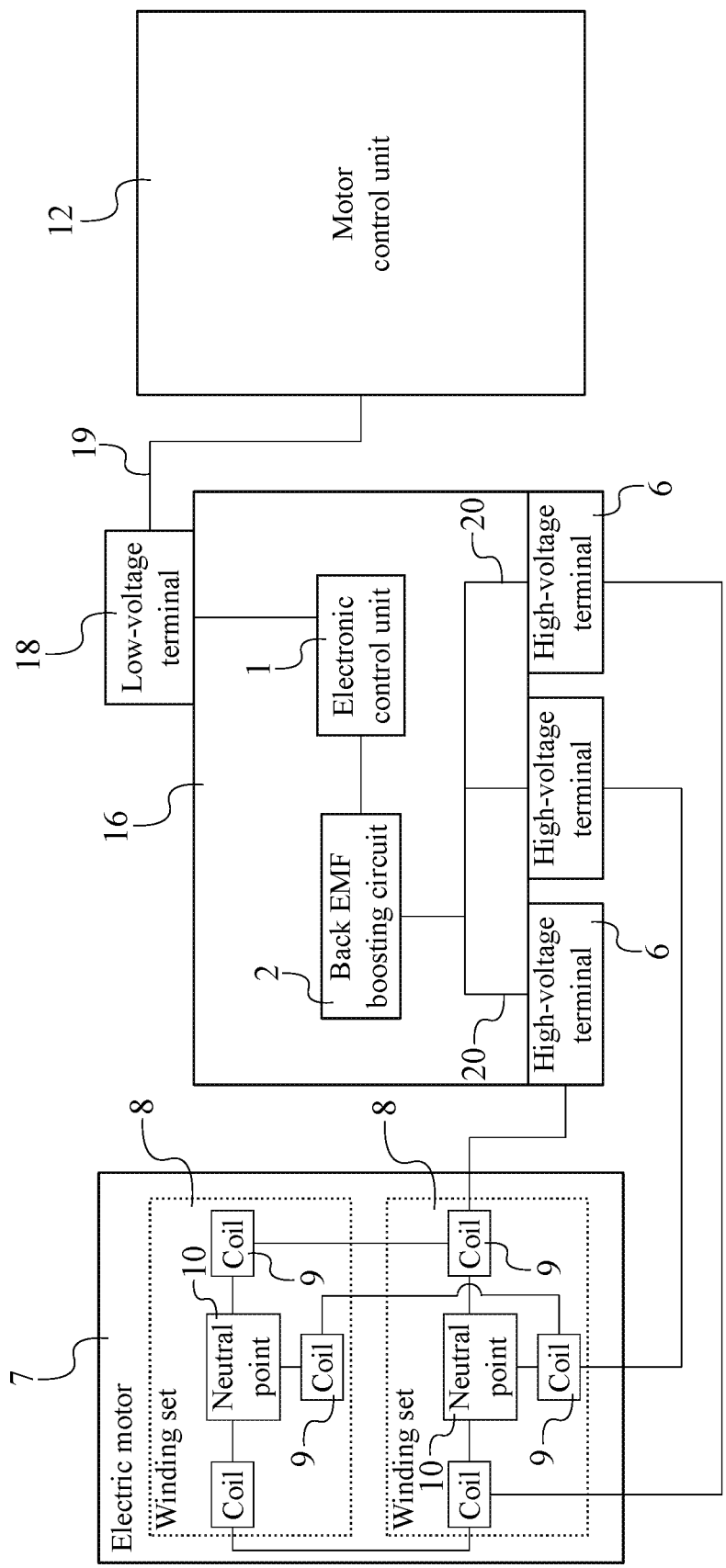
FIG. 3 is a schematic diagram illustrating the system of the present invention with the low-voltage terminal.
Figure 9:
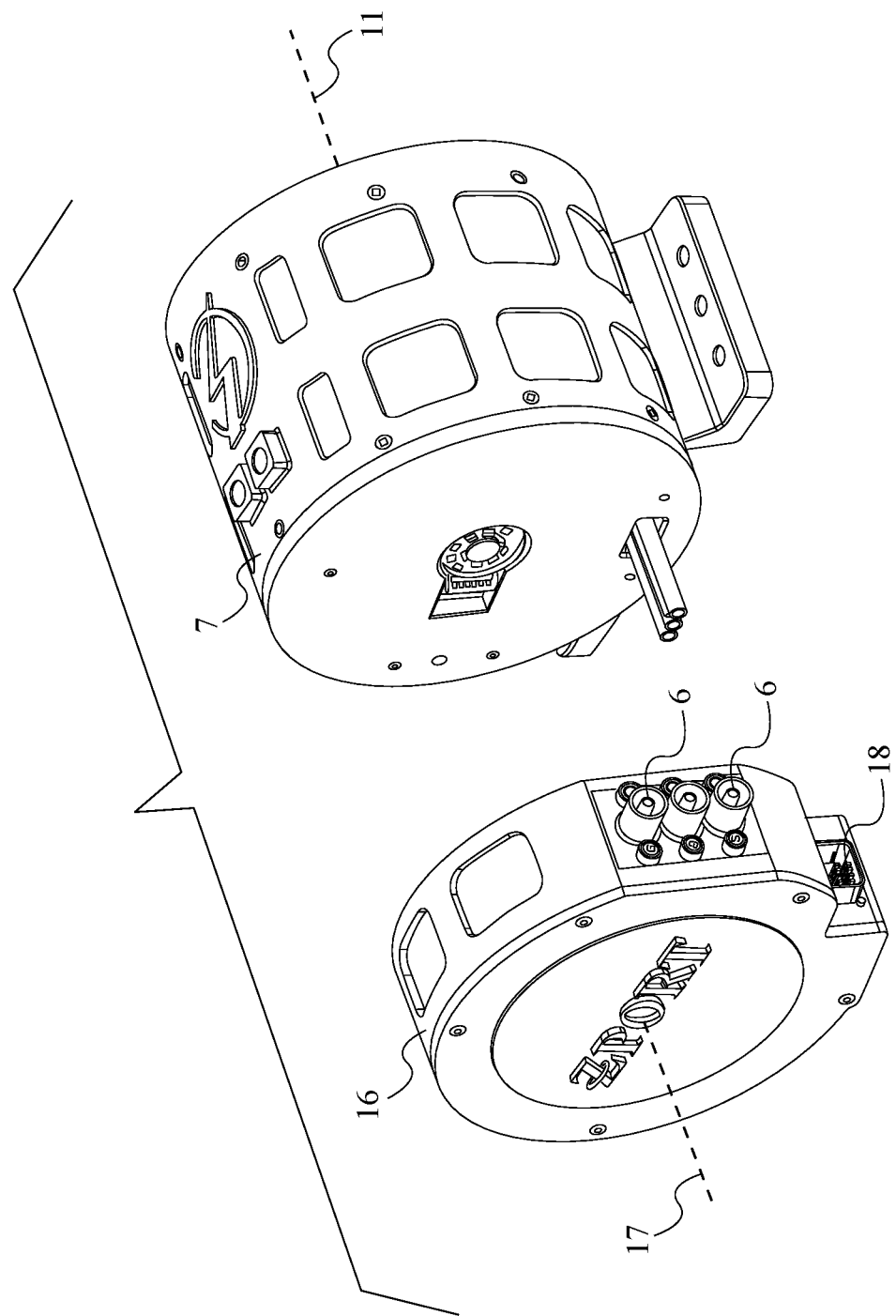
FIG. 9 is an exploded perspective view of present invention.
Figure 12:
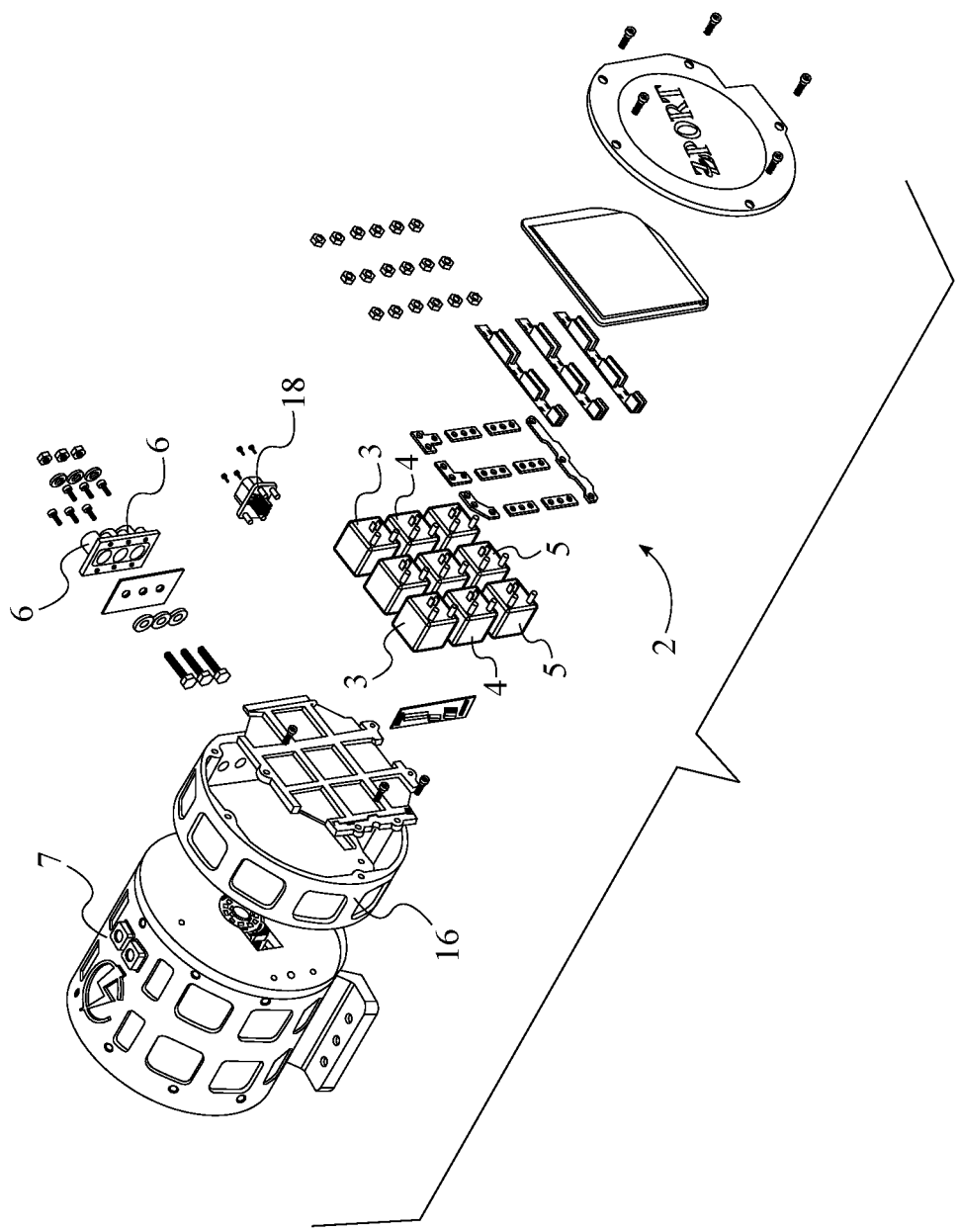
FIG. 12 is another exploded perspective view of the present invention.

With reference to FIGS. 3, 9, and 12, the present invention may further comprise a housing 16 in order to protect and conceal the electronic components and at least one low-voltage terminal 18 in order to establish the electrical connection between the motor control unit 12 and the electronic control unit 1. The electric motor 7 and the motor control unit 12 are externally positioned to the housing 16. In further detail, the electric motor 7 and the motor control unit 12 are standard components of an electric vehicle, and the present invention is preferably retrofitted into an electric vehicle. The at least one low-voltage terminal 18 and the plurality of high-voltage terminals 6 are mounted into the housing 16. Thus, the at least one low-voltage terminal 18 and the plurality of high-voltage terminals 6 are protected while still allowing feasible accessibility in order to establish electrical connections. The electronic control unit 1 and the back EMF boosting circuit 2 are mounted within the housing 16. Thus, the electronic control unit 1 and the back EMF boosting circuit 2 are protected and concealed by the housing 16. The at least one low-voltage terminal 18 is positioned offset from the plurality of high-voltage terminals 6 about the housing 16 in order to allow a user to easily access the at least one low-voltage terminal 18 and the plurality of high-voltage terminals 6 without electrical or physical obstructions. Further, the motor control unit 12 is electrically connected to the electronic control unit 1 by the at least one low-voltage terminal 18. This establishes a safe and efficient electrical connection between the electronic control unit 1 and the motor control unit 12.

In the preferred embodiment and with reference to FIG. 9, the housing 16 is externally mounted to the electric motor 7. In further detail, a set of fasteners is used to fully secure the housing 16 to the electric motor 7. Moreover, a central axis 17 of the housing 16 is positioned collinear to a rotation axis 11 of the electric motor 7. This arrangement allows the housing 16 and the electric motor 7 to form a rotational balanced structure.

In order for terminals of the motor control unit 12 to be accessed and with reference to FIG. 3, the present invention may further comprise at least one low-voltage wire 19. The at least one low-voltage terminal 18 is electronically connected to the motor control unit 12 by the at least one low-voltage wire 19. Thus, the terminals of the motor control unit 12 can be accessed in order for commands to be relayed from the motor control unit 12 to the electronic control unit 1.

In order for the plurality of high-voltage terminals 6 to be accessed and with reference to FIG. 1, the present invention may further comprise a plurality of high-voltage wires 20. Each of the electrical phases is associated to a corresponding high-voltage wire from the plurality of high-voltage wires 20. The corresponding high-voltage terminal is electrically connected to the back EMF boosting circuit 2 by the corresponding high-voltage wire. Thus, electrical energy can be transferred from the back EMF boosting circuit 2 to the plurality of high-voltage terminals 6.

Each of the plurality of first switches 13, each of the plurality of second switches 14, and each of the plurality of third switches 15 are preferably a high-voltage switch that is either a silicon, silicon carbide (SiC), or a gallium nitride (GaN) based power switch. Further, each of the plurality of first switches 13, each of the plurality of second switches 14, and each of the plurality of third switches 15 include an actuator relay and a low-voltage control gate in order to effectively open or close electrical connections. In electromechanical implementations, each of the plurality of first switches 13, each of the plurality of second switches 14, and each of the plurality of third switches 15 have a high-voltage circuit and a low-voltage circuit. The high voltage circuit contains two electrically conductive plates which physically may move toward each other and make a physical contact to conduct electricity or which may physically move away from each other to disconnect electricity. The mechanism of movement is provided by a mechanical actuator which may be controlled by a low-voltage terminal circuit such as solenoid.

Figure 11:
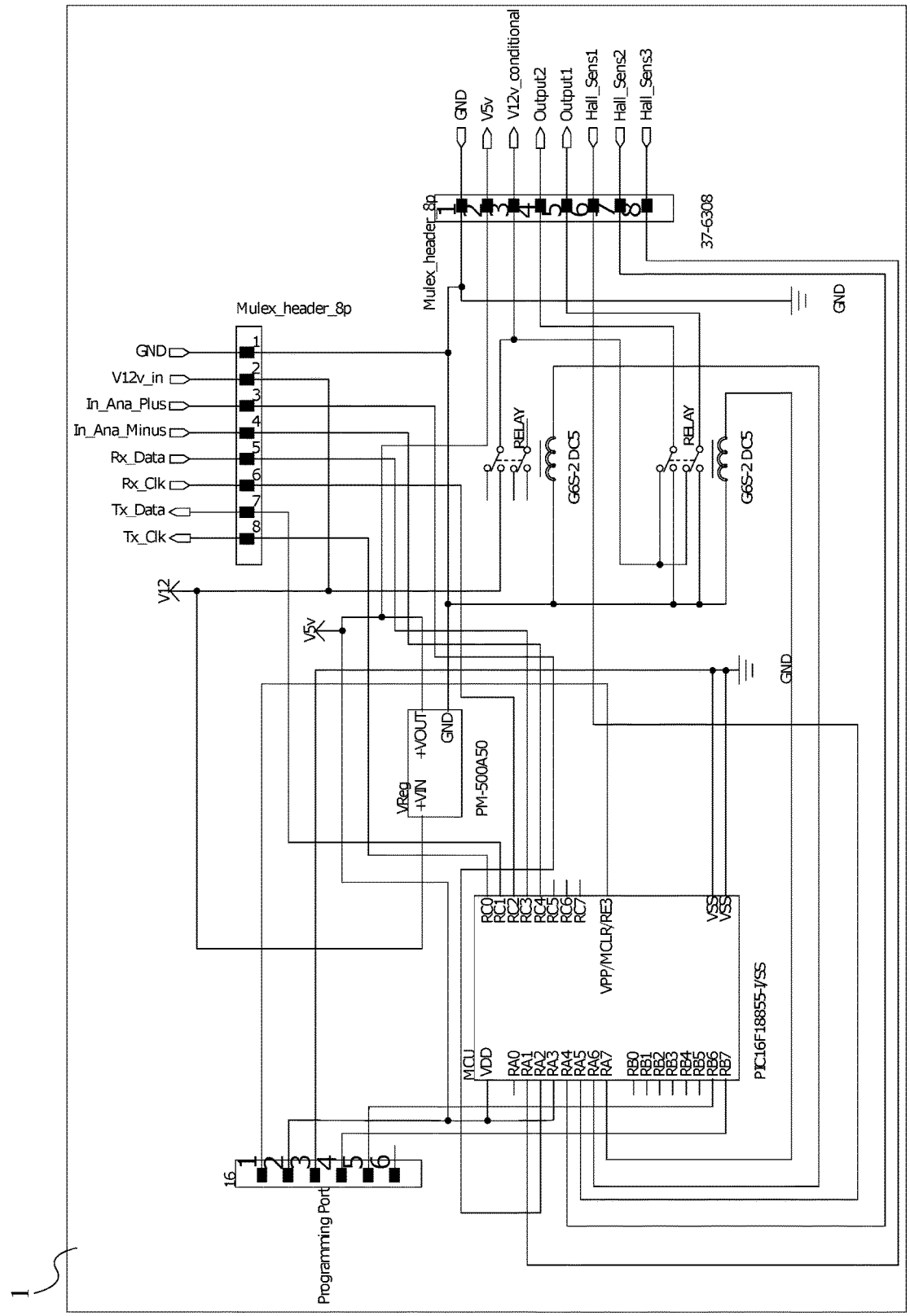
FIG. 11 is an exemplary schematic diagram of the electronic control unit.

With reference to FIG. 11, the electronic control unit 1 preferably includes a printed circuit board, a microcontroller, a DC voltage regulator, a serial communication circuit, a plurality of multi-function relays, an input terminal, an output terminal, a plurality of hall sensor inputs, a plurality of output command terminals, and a high-voltage terminal interlock circuit. The microcontroller is programmed to define the states of the electric motor 7 based on the commands received from the motor control unit 12, the state of signals received form a plurality of hall sensors, and the state of signals received from a plurality of thermal sensors. A DC supply may be supplied by the low-voltage battery of a vehicle. Voltage may be regulated and may be supplied to the microcontroller and the plurality of multi-function relays. The received commands from the motor control unit 12 board are relayed to the microcontroller. After processing the commands from the motor control unit 12, proper commands are sent to the plurality of multi-function relays. The plurality of multi-function relays configures the back EMF boosting circuit 2 in such a way that proper commands are received. The back EMF boosting circuit 2 transfers the commands to the each of the control gates of each of the plurality of first switches 13, each of the plurality of second switches 14, and each of the plurality of third switches 15.

As mentioned previously, the electronic control unit 1 is electronically connected to the back EMF boosting circuit 2 and to the motor control unit 12 by the at least one low-voltage terminal 18. Thus, high voltage may be supplied to the plurality of high-voltage terminals 6 from the motor control unit 12, and control commands may be supplied to the at least one low-voltage terminal 18 in order to configure the stage of base cell. Electrical energy from the plurality of high-voltage terminals 6 will transfer to plurality of bus bars of the back EMF boosting circuit 2 and may be received by a base cell. Accordingly, in some embodiments, the electric motor 7 may convert the electrical power of a high-voltage battery to mechanical power to drive and rotate an axle (and, thus, one or more wheels) of the vehicle. However, it will be appreciated that the electric motor 7 may be configured for a different use without departing from the scope of the present invention.

Supplemental Description

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, electric winding exchanger with different configurations with an integrated assembly into electric motors and/or electric drive modules that introduces noble performances and integration benefits to electric vehicles. The present invention is introduced for three phase powertrain systems including Phase A, Phase B, and Phase C. It is introduced with capability for connections to electric motors with two, three, or four parallel path windings. The present invention in the powertrain is specified between the electric motor 7 and the motor control unit 12. The present invention comprises a back EMF boosting circuit 2 that is isolated from control board circuit and the housing 16 using gaps and electrical insulators. The present invention may further comprise a plurality of first switches 13, a plurality of second switches 14, and a plurality of third switches 15. The control gate of each of the plurality of first switches 13, each of the plurality of second switches 14, and each of the plurality of third switches 15 is routed using solid copper bars to the terminals of the electric motor 7 and the motor control unit 12. The control gate of each of the plurality of first switches 13, the plurality of second switches 14, and the plurality of third switches 15 is connected to the circuit board of the back EMF boosting circuit 2. The electronic control unit 1 includes an internal processor and is electrically connected to low-voltage terminals for receiving commands from the motor control unit 12. Five basic commands may be received from motor control unit 12. These independent commands will be received by the at least one low-voltage terminal 18, relayed to the microprocessor of the electronic control unit 1, and the electronic control unit 1 then relays specific commands to the control gates of each of the plurality of first switches 13, each of the plurality of second switches 14, and each of the plurality of third switches 15. The commands configure each of the plurality of first switches 13, the plurality of second switches 14, and the plurality of third switches 15 in such a way that five different states can form corresponding to each specific command received from input terminals. Operation state 1 is a normal torque mode. Operation state 2 is a high-torque mode. Operation state 3 is a high-speed mode. Operation state 4 is a disconnected state. Operation state 5 is a transient state allowing transition from one state to another state. Each state, as will be discussed, this provides a number of performance benefits for overall powertrain torque speed profile. Also, the motor shaft provides higher efficiency operation, higher acceleration per electric current and higher speed per available DC bus voltage and other advantages.

In some embodiments, the back EMF boosting circuit 2 may include extra two or more phases (i.e., D, E, F, . . . ) that will be configured the same as Phase A, B, and C. The number of external high-voltage connections of the present invention for an electric motor 7, with two parallel winding, is minimum three per phase for a three phase motors and is one per phase for a 3-phase motor control unit 12. The number of external high-voltage connections of the present invention from an electric motor 7, with three parallel winding, is minimum five per phase for a three phase motors and is one per phase for a 3-phase motor control unit 12. The number of external high-voltage connections of the present invention from an electric motor 7, with four parallel winding, is minimum seven per phase for a three phase motors and is one per phase for a 3-phase motor control unit 12.

In some embodiments, the back EMF boosting circuit 2 may be external to the housing 16. In this case, the control commands may be directly received by the control gates each of the plurality of first switches 13, each of the plurality of second switches 14, and each of the plurality of third switches 15. The control commands are directly or indirectly sent by the motor control unit 12.

Also, the housing 16 may be isolated from the electric motor 7 and/or electric drive module. The housing 16 may be directly fixed to the vehicle body. The plurality of high-voltage terminals 6 may be connected to the motor terminals and to the motor control unit terminals using high-voltage cables.

The present invention can reconfigure an electric motor 7 to include a torque-speed profile with three states of a normal torque profile, a high-torque profile, and a high-speed profile. In multi-phase electric motors such as 3-phase electric motor, a torque-speed profile has a constant torque region and a constant power region, the Torque is proportional to the following equation at a constant mechanical speed of $\omega_m$.

$$T \propto \frac{E \times I}{\omega_m} \quad \text{(Eq. 1)}$$

... where E is the back EMF, 1 is the input current [A], and $\omega_m$ is the mechanical speed. In multi-phase Permanent magnet motor the equation is further expanded to:

$$T \propto \frac{K_{pm} \times \omega_\theta \times N_s \times N_p \times \frac{1}{N_p}}{\omega_m} \quad \text{(Eq. 2)}$$

... where $K_{pm}$ is a constant and depends on the motor airgap flux density in [Tesla], $\omega_e$ is the radian frequency of rotating magnetic field [rad/sec], and $N_s$ is the total number of series coils in a winding-set and $N_p$ is the number of winding-set in the motor (parallel paths). All of the winding sets are in parallel. It is mentioned that we might have up to several winding sets each having $$\frac{1}{N_p}$$

[Amps].

$$\frac{1}{N_p}$$

directly affects the cooling of the motor.

Using the electric winding exchanger system between an electric motor 7 and a motor control unit, the winding pattern of the electric motor 7 is reconfigured in order to change the back EMF in real time for converting a normal torque profile to a high-torque profile or a high-speed profile. The back EMF boosting is done by changing the ratio of $N_s$ and $N_p$. This is done by automatic reconfiguration of winding during operation in real-time using the electric winding exchanger system. In other words, the total series Amp turn of the motor $N_s \times I$, can be doubled, tripled, or other multiple resulting in the doubled, tripled, and multiple torque ratios. This needs to be done with certain consideration of the thermal duration limits. Similarly, in multi-phase induction motors, the equation is further expanded to:

$$T \propto \frac{K_{IN} \times I \times \omega_\theta \times N_s \times N_p \times \frac{1}{N_p}}{\omega_m} \quad \text{(Eq. 3)}$$

The total series Amp turn of the motor $N_s \times I$, can be doubled, tripled, or other multiple resulting in the doubled, tripled, and multiple torque ratios. Table 1 shows a typical electric motor winding pattern reconfiguration i.e. $N_p$ versus $N_s$ during the electric winding exchanger operation. For example for an electric motor 7 with two parallel winding set, normal torque will be converted to high torque profile by changing $N_s$ from K2 to 2K2 and by changing $N_p$ from K1 K1/2. This is done without the need for extra current [Amps] from the motor control unit. It is mentioned that in the electrical motor 7, the phase resistance of the electric motor 7 should be small enough (at least $$R < \frac{\frac{VDC}{2\sqrt{2}} - E_{ph-n}}{N \times \max(I)}$$

so that the peak current of the electric motor 7 does not significantly change when $N_s$ or corresponding electric motor resistance is increasing. $E_{ph-n}$ is the RMS of phase-neutral back EMF. In this case an increase in $E_{an}$ is always higher than decrease in max(I) and the power of the electric motor 7 increases.

TABLE 1

Configuration table of electric winding exchanger for achieving different ratio of torque profile

| Max $\frac{T(N, m)}{1(A)}$ @ constant torque region | $T_m$ | $2T_m$ | $3T_m$ | ... | $NT_m$ |
|---|---|---|---|---|---|
| $N_s$ | K2 | 2K2 | 3K2 | ... | NK2 |
| $N_p$ | K1 | K1/2 | K1/3 | ... | K1/N |
| Max $\frac{\omega_m(RPN)}{VDO(V)}$ @ constant Power region | $\omega_m$ | $\frac{\omega_m}{2}$ | $\frac{\omega_m}{3}$ | ... | $\frac{\omega_m}{N}$ |
| $N_s$ | K2 | 2K2 | 3K2 | ... | NK2 |
| $N_p$ | K1 | K1/2 | K1/3 | ... | K1/N |

Table 2 shows another typical electric motor winding pattern reconfiguration i.e. $N_p$ versus $N_s$ during the electric winding exchanger operation. For example for an electric motor 7 with two parallel winding set, normal torque is converted to high torque profile by changing $N_s$ from K2 to K2/2 and by changing $N_p$ from K1 to 2K1. This is done without excessive the need for voltage from electric high voltage DC bus.

TABLE 2

Configuration table of electric winding exchanger for achieving wide-torque speed range

| Max $\frac{T(N, m)}{\max 1(A)}$ @ constant torque region | $T_m$ | $T_m/2$ | $T_m/3$ | ... | $T_m/N$ |
|---|---|---|---|---|---|
| $N_s$ | K2 | K2/2 | K2/3 | ... | K2/N |
| $N_p$ | K1 | 2K1 | 3K1 | ... | NK1 |
| Max $\frac{\omega_m(RPN)}{VDO(V)}$ @ constant Power region | $\omega_m$ | $2\omega_m$ | $3\omega_m$ | ... | $N\omega_m$ |
| $N_s$ | K2 | K2/2 | K2/3 | ... | K2/N |
| $N_p$ | K1 | 2K1 | 3K1 | ... | NK1 |

The torque-speed profile is the functional performance of an electric motor shaft located in a powertrain including 3-phase electric motor winding, the plurality of high-voltage terminals 6 of the present invention, the high-voltage terminals of the motor control unit 12, and the high-voltage terminals of a battery. Physical location of the plurality of high-voltage terminals 6 of the present invention is preferably in an electric motor high-voltage terminal box, in a motor control unit high-voltage terminal box, or external housing 16 between the electric motor 7 and motor control unit 12. From the motor control unit high-voltage terminals, the present invention and motor control unit 12 have an equal number of terminals. For example, for a 3-phase system, each have 3 terminals. From motor winding coils set, the present invention includes a maximum $2 \times P \times N_p$ terminals and minimum $((2 \times P \times N_p) - P)$ for a P-phase system. From the motor control unit high-voltage side, E-Glutch always has P terminals.

Although the invention has been explained in relation to its preferred embodiment, it is to be understood that many other possible modifications and variations can be made without departing from the spirit and scope of the invention as hereinafter claimed.

What is claimed is:

1. An electric winding exchanger system comprises:
    an electronic control unit;
    a back electromotive force (EMF) boosting circuit;
    a plurality of high-voltage terminals;
    an electric motor;
    a motor control unit;
    the electric motor comprises a plurality of winding sets;
    each of the plurality of winding sets comprises a plurality of coils and a neutral point;
    the motor control unit being electronically connected to the electronic control unit;
    the electronic control unit being electronically connected to the back EMF boosting circuit;
    the electric motor being configured to operate through a plurality of electrical phases, wherein each of the plurality of electrical phases is associated to a corresponding high-voltage terminal from the plurality of high-voltage terminals and a corresponding coil from the plurality of coils;
    the neutral point being selectively and electrically connected to each of the plurality of coils;
    the corresponding coil being selectively and electrically connected to the back EMF boosting circuit by the corresponding high-voltage terminal; and
    the corresponding coil for an arbitrary winding set being selectively and electrically connected to the corresponding coil for another winding set, wherein the arbitrary winding set and the other winding set are from the plurality of winding sets.

2. The electric winding exchanger system as claimed in claim 1 comprises:
    a plurality of first switches;
    the neutral point being electrically connected to the corresponding coil by a corresponding first switch from the plurality of first switches; and
    the back EMF boosting circuit being electronically connected to each of the plurality of first switches.

3. The electric winding exchanger system as claimed in claim 2 comprises:
    the back EMF boosting circuit comprises a plurality of first switch-controlling modules;
    the electronic control unit being electronically connected to each of the plurality of first switch-controlling modules; and
    each of the plurality of first switch-controlling modules being electronically connected to a corresponding first switch from the plurality of first switches.

4. The electric winding exchanger system as claimed in claim 1 comprises:
    a plurality of second switches;
    the corresponding coil being electrically connected to the corresponding high-voltage terminal by a corresponding second switch from the plurality of second switches; and
    the back EMF boosting circuit being electronically connected to each of the plurality of first switches.

5. The electric winding exchanger system as claimed in claim 4 comprises:
    the back EMF boosting circuit comprises a plurality of second switch-controlling modules;
    the electronic control unit being electronically connected to each of the plurality of second switch-controlling modules; and
    each of the plurality of second switch-controlling modules being electronically connected to a corresponding second switch from the plurality of second switches.

6. The electric winding exchanger system as claimed in claim 1 comprises:
    a plurality of third switches;
    the corresponding coil for the arbitrary winding set being electrically connected to the corresponding coil for the other winding set by a corresponding third switch from the plurality of third switches; and
    the back EMF boosting circuit being electronically connected to each of the plurality of third switches.

7. The electric winding exchanger system as claimed in claim 6 comprises:
    the back EMF boosting circuit comprises a plurality of third switch-controlling modules;
    the electronic control unit being electronically connected to each of the plurality of third switch-controlling modules; and
    each of the plurality of third switch-controlling modules being electronically connected to a corresponding third switch from the plurality of third switches.

8. The electric winding exchanger system as claimed in claim 1 comprises:
    wherein the electric motor is in a normal state;
    the neutral point for the arbitrary winding set being electrically connected to each of the plurality of coils for the arbitrary winding set;
    the neutral point for the other winding set being electrically connected to each of the plurality of coils for the other winding set; and
    the corresponding coil for the arbitrary winding set and the corresponding coil for the other winding set being electrically connected in parallel with the corresponding high-voltage terminal.

9. The electric winding exchanger system as claimed in claim 1 comprises:
    wherein the electric motor is in a high-torque state;
    the neutral point for the arbitrary winding set being electrically connected to each of the plurality of coils for the arbitrary winding set;
    the neutral point for the other winding set being electrically disconnected to each of the plurality of coils for the other winding set; and
    the corresponding coil for the arbitrary winding set and the corresponding coil for the other winding set being electrically connected in series with the corresponding high-voltage terminal.

10. The electric winding exchanger system as claimed in claim 2 comprises:
    wherein the electric motor is in a transient state;
    the neutral point for the arbitrary winding set being electrically connected to each of the plurality of coils for the arbitrary winding set;
    the neutral point for the other winding set being electrically disconnected to each of the plurality of coils for the other winding set; and the corresponding coil for the arbitrary winding set and the corresponding coil for the other winding set being electrically connected in parallel with the corresponding high-voltage terminal.

11. The electric winding exchanger system as claimed in claim 2 comprises:
    wherein the electric motor is in a disconnected state;
    the neutral point for the arbitrary winding set being electrically connected to each of the plurality of coils for the arbitrary winding set;
    the neutral point for the other winding set being electrically disconnected to each of the plurality of coils for the other winding set;
    the corresponding coil for the arbitrary winding set being electrically disconnected with the corresponding high-voltage terminal; and
    the corresponding coil for the other winding set being electrically connected with the corresponding high-voltage terminal.

12. The electric winding exchanger system as claimed in claim 1 comprises:
    a housing;
    at least one low-voltage terminal;
    the electric motor and the motor control unit being externally positioned to the housing;
    the at least one low-voltage terminal and the plurality of high-voltage terminals being mounted into the housing;
    the electronic control unit and the back EMF boosting circuit being mounted within the housing;
    the at least one low-voltage terminal being positioned offset from the plurality of high-voltage terminals about the housing; and
    the motor control unit being electronically connected to the electronic control unit by the at least one low-voltage terminal.

13. The electric winding exchanger system as claimed in claim 12 comprises:
    the housing being externally mounted to the electric motor; and
    a central axis of the housing being positioned collinear to a rotation axis of the electric motor.

14. The electric winding exchanger system as claimed in claim 12 comprises:
    at least one low-voltage wire; and
    the at least low-voltage terminal being electronically connected to the motor control unit by the at least one low-voltage wire.

15. The electric winding exchanger system as claimed in claim 1 comprises:
    a plurality of high-voltage wires, wherein each of the plurality of electrical phases is associated to a corresponding high-voltage wire from the plurality of high-voltage wires; and
    the corresponding high-voltage terminal being electrically connected to the back EMF boosting circuit by the corresponding high-voltage wire.

* * * * *